United States Patent [19]

Owens et al.

[11] Patent Number: 4,464,262
[45] Date of Patent: Aug. 7, 1984

[54] LIQUID FLOW DISTRIBUTOR

[75] Inventors: Roger W. Owens, Deer Park, N.Y.; Robert F. Hickey, Florence, Mass.; Constantine Capetanopoulos, Dobbs Ferry, N.Y.

[73] Assignee: Ecolotrol, Inc., Bethpage, N.Y.

[21] Appl. No.: 394,147

[22] Filed: Jul. 1, 1982

[51] Int. Cl.³ .................. B01D 35/22; B05B 15/04
[52] U.S. Cl. .................. 210/291; 239/499; 239/550
[58] Field of Search ........... 210/288, 289, 291, 293; 239/550, 499

[56] References Cited

U.S. PATENT DOCUMENTS

| | | | |
|---|---|---|---|
| 524,155 | 8/1894 | Williamso | 210/288 X |
| 1,903,611 | 4/1933 | Dotterweich | 210/289 |
| 1,985,162 | 12/1934 | Gilles | 210/288 |
| 3,429,443 | 2/1969 | Stern | 210/288 |
| 3,730,348 | 5/1973 | Weis | 210/289 |
| 3,826,375 | 7/1974 | Fournier | 210/291 |
| 4,107,044 | 8/1978 | Levenchsky | 210/291 X |

FOREIGN PATENT DOCUMENTS

| | | | |
|---|---|---|---|
| 901410 | 1/1954 | Fed. Rep. of Germany | 210/291 |
| 568547 | 11/1957 | Italy | 210/289 |

*Primary Examiner*—Andres Kashnikow
*Attorney, Agent, or Firm*—Michael Ebert

[57] ABSTRACT

A liquid flow distributor for dispersing wastewater or other liquid carrying stringy solids throughout a particulate media such as in a fluidized bed reactor. The distributor is adapted to allow unimpeded forward flow of the liquid into the media and it also functions to minimize backflow of the media into the distributor should forward flow be arrested. The distributor includes an array of like nozzles, each having an inlet port leading into a conical flow expansion section whose cone angle is such that the nozzle capable of flowing full without significance turbulence, the mouth of the flow expansion section merging with a cylindrical outlet section whose dimensions are such that any backflow which takes place when forward flow is arrested will normally be insufficient to lift the bed particles into the nozzle.

8 Claims, 9 Drawing Figures

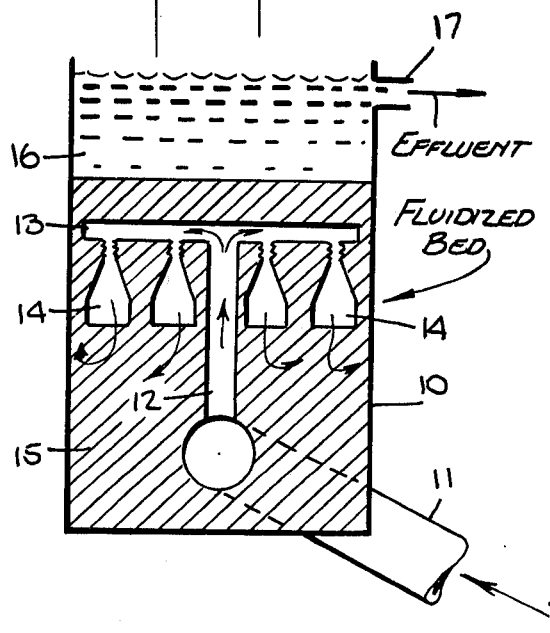
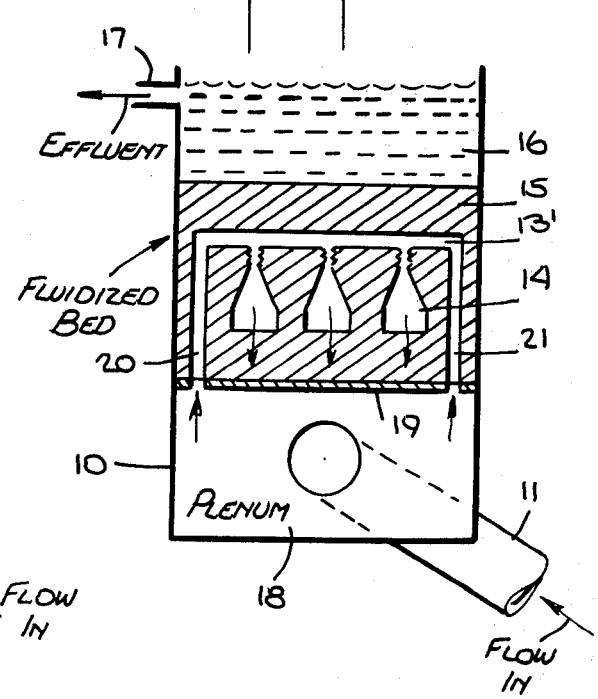
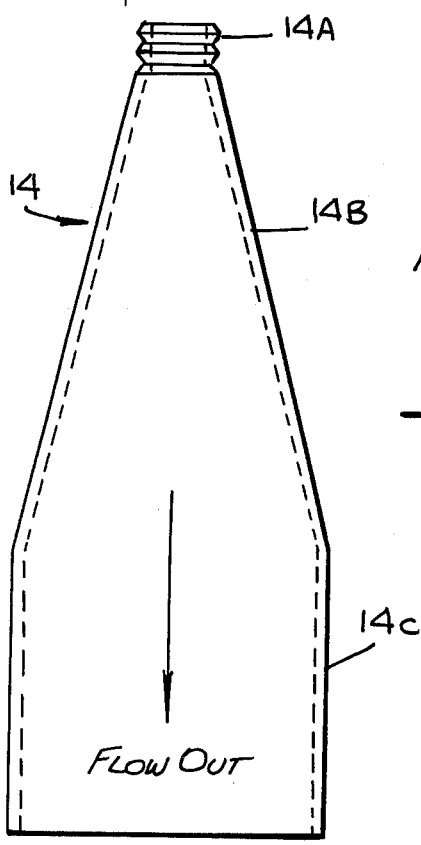
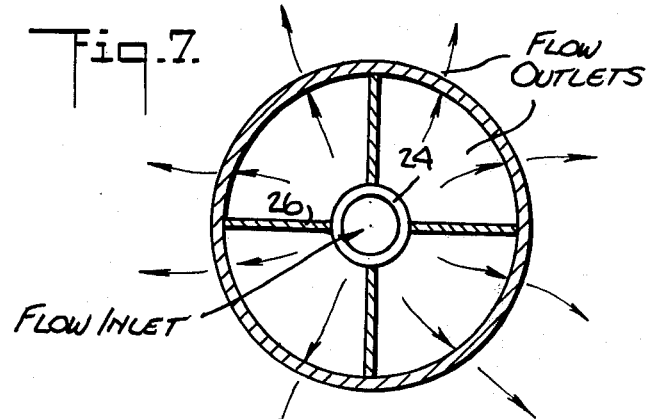
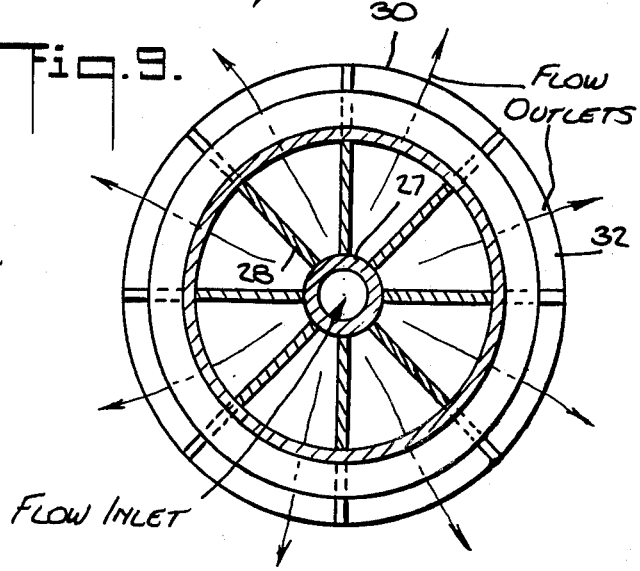

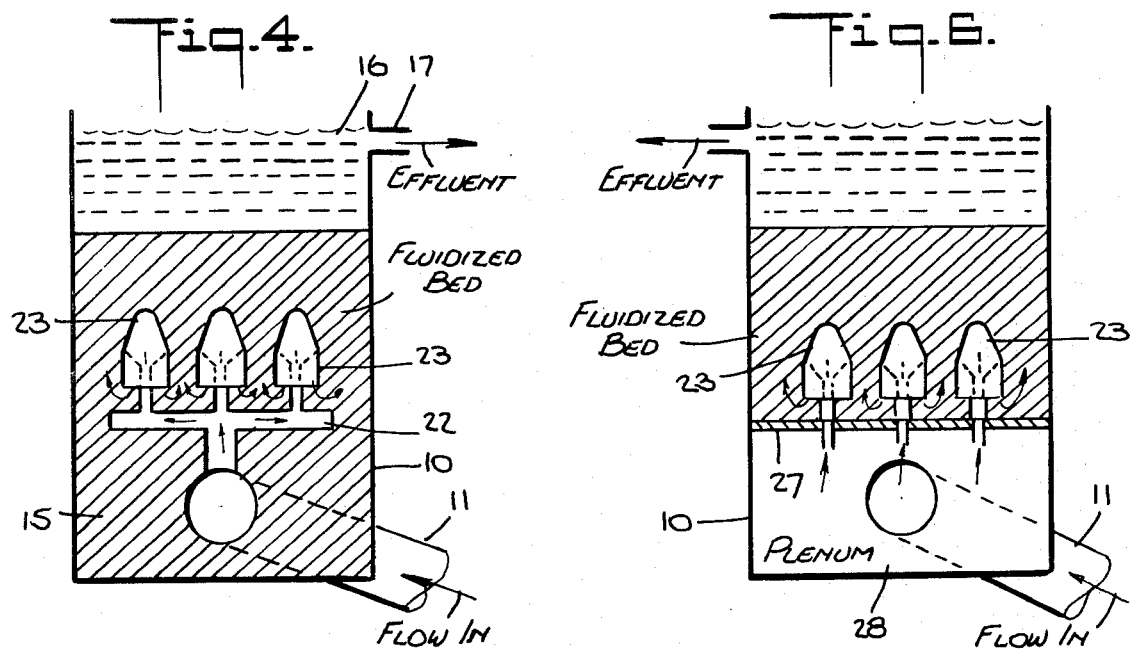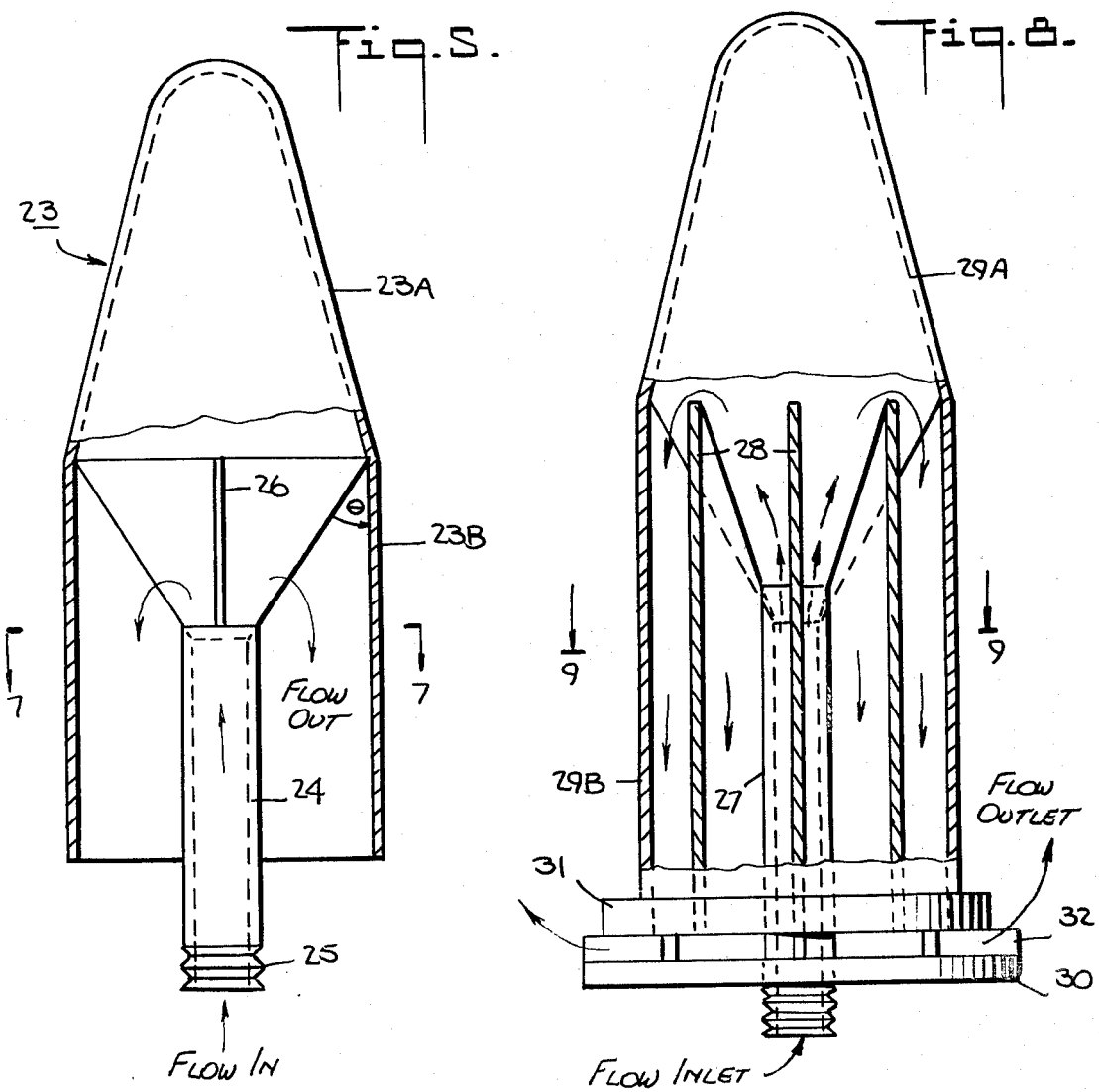

LIQUID FLOW DISTRIBUTOR

BACKGROUND OF INVENTION

This invention relates generally to liquid flow distributors, and in particular to a distributor for an expanded or fluidized bed reactor, the distributor permitting unimpeded forward flow of liquids carrying stringy solids and also functioning to prevent backflow of the fluidized media when forward flow through the reactor is arrested.

In a fluidized bed reactor for treating industrial or municipal wastewater, the wastewater is conducted upwardly through a bed of seeded carrier particles such as sand. In the course of operation, these particles are enlarged by the biological growth of cellular material. Because the particles in the bed are suspended by the upwardly flowing liquid stream and are in continuous motion, an enormous surface area is available for such biological growth. Fluidized bed reactors of this type are disclosed in U.S. Pat. Nos. 3,846,289; 3,956,129; 4,009,098 and 4,009,099.

In a fluidized reactor, the incoming wastewater must be dispersed throughout the bed, and for this purpose use is made of a network of outlets forming a flow distributor. Thus U.S. Pat. No. 4,202,774 to Kos discloses a flow distributor having an array of ports so arranged as to assure a smooth, low turbulent flow of liquid into the reactor to effectively fluidize the bed particles therein.

Wastewater to be treated often carries stringy solids which, when passing through a conduit having an obstruction therein, tend to collect about the obstruction and thereby clog the passage. The primary concern of the present invention is with a liquid flow distributor that will allow stringy solids carried by the wastewater being treated to pass through the distributor without causing clogging, the distributor preventing the media being fluidized from flowing therein as a result of backflow when forward flow is arrested. Inasmuch as in a conventional fluidized bed reactor, a head of clear effluent is developed above the fluidized bed, should forward flow through the reactor be stopped, the effluent may then backflow through the bed and in the course thereof seek to transport toward the distributor, particles derived from the bed.

In general, devices heretofore employed to distribute a liquid or gas into a fluidized bed fall into two distinct classes. One type, such as that disclosed in the Olavson U.S. Pat. No. 3,334,819 makes use of conical nozzles which act to resist backflow of the fluidized media into the distributor when the process is brought to a halt. But such nozzles are subject to clogging should the wastewater or other fluidized medium have stringy solids therein.

The second type, such as that disclosed in Perry's *Chemical Engineer's Handbook*, makes use of a T-bar distributor usable in those situations in which the liquid or gas fluidizing medium contains stringy solids. However, this distributor has the disadvantage of permitting flowback of the fluidized media into the distribution ports when the process is arrested.

Commercially-available underdrain nozzles for filters, such as those described in U.S. Pat. No. 3,472,382, are similar to those used in fluidized bed reactors, use being made of a strainer to prevent media backflow. But such strainers interfere with forward flow when the fluid being filtered carries stringy solids. While the present invention will be described in the context of fluidized bed reactors, it is to be understood that the distributors disclosed herein are also useful as an underdrain for a filter.

SUMMARY OF INVENTION

In view of the foregoing, the main object of this invention is to provide a liquid flow distributor which permits the forward flow of a liquid carrying stringy solids without clogging the distributor, and which functions to prevent backflow of the media in the event forward flow is arrested.

More particularly, an object of this invention is to provide a wastewater flow distributor for a fluidized bed reactor having the above-noted characteristics, which distributor may be manufactured and installed at relatively low cost.

Also an object of the invention is to provide a distributor constituted by a liquid manifold associated with an array of replaceable screw-in nozzles to facilitate servicing and repairs.

Briefly stated, these objects are attained in a flow distributor for a fluidized bed reactor in which the incoming liquid is fed into a manifold having a uniform array of openings each having a nozzle screwed or otherwise secured thereto.

The nozzle is constituted by an inlet port leading to a conical flow expansion section whose cone angle is between 5 and 120 degrees and preferably between 15 and 60 degrees, whereby the nozzle is capable of flowing full without producing significant turbulence, the mouth of the flow expansion section merging with a cylindrical outlet section whose dimensions are such that backflow currents which arise when forward flow is arrested will normally be insufficient to lift the bed particles into the nozzle.

OUTLINE OF DRAWINGS

For a better understanding of the invention as well as other objects and further features thereof, reference is made to the following detailed description to be read in conjunction with the accompanying drawings, wherein:

FIG. 1 schematically illustrates a fluidized bed reactor which includes a first preferred embodiment of a flow distributor in accordance with the invention;

FIG. 2 illustrates one of the nozzles included in the FIG. 1 flow distributor;

FIG. 3 shows a modified form of flow distributor of the FIG. 1 type;

FIG. 4 schematically illustrates a fluidized bed reactor which incorporates a second preferred embodiment of a flow distributor in accordance with the invention;

FIG. 5 shows one of the nozzles included in FIG. 4 flow distributor;

FIG. 6 schematically illustrates a modified form of flow distributor of the FIG. 4 type;

FIG. 7 is a transverse section taken through the nozzle shown in FIG. 5;

FIG. 8 illustrates, partly in section, the nozzle for a third embodiment of a flow distributor in accordance with the invention; and FIG. 9 is a transverse section taken through FIG. 8.

DESCRIPTION OF INVENTION

First Embodiment:

Referring now to FIG. 1, there is shown a fluidized bed reactor 10 into which wastewater is introduced through an inlet line 11. Line 11 is coupled to a central supply pipe 12 leading upwardly to a horizontal manifold 13 provided with a uniform array of nozzles 14 which discharge the incoming wastewater downwardly into a fluidized bed 15. The bed is composed of biota-seeded solid particles of sand or other particulate material. These particles are fluidized by the passage of wastewater at an appropriate velocity through the reactor column.

Developed above fluidized bed 15 is an effluent head 16 whose level is fixed by a clear effluent discharge port 17 adjacent the upper end of the reactor. In the course of reactor operation, the cellular material on the particles continue to grow, causing the fluidized bed to expand upwardly, this expansion being accompanied by the concurrent contraction of the effluent head. Means (not disclosed herein) such as is described in the Jeris U.S. Pat. No. 4,009,099, are used to prevent the accumulation of excessive cellular material. Such means are not the concern of the present invention.

Nozzle 14, as best seen in FIG. 2, is preferably fabricated of a high-strength plastic or metal material chemically resistant to wastewater. It includes a screw-in inlet port 14A leading into a conical flow expansion section 14B whose mouth merges with a cylindrical outlet section 14C. In one actual embodiment of this structure, the overall length of the nozzle from the extremity of inlet port 14A to that of outlet section 14 is 8 inches, of which $2\frac{3}{4}$ inches represents the length of the outlet section, $5\frac{1}{4}$ inches that of the flow expansion section including the inlet port, the wall thickness being $\frac{1}{8}$ inch. The internal diameter of the inlet port is 0.4 inches, and that of the outlet section 3 inches. In practice, rather than a screw-in inlet port, this port may be of the snap-in type, or even welded to the manifold.

Nozzle 14, shown in FIGS. 1 and 2, discharges downwardly into bed 15, the array of these nozzles acting as a distribution network dispersing the incoming wastewater throughout the bed. In order to have the nozzle flow full without producing any backward eddy current or significant turbulence, the cone angle of conical flow expansion section 14B is preferably between 15 and 60 degrees, although it may generally lie in a range of between 5 and 120 degrees.

The cylindrical outlet section 14C acts as a barrier to prevent the sand or other particles which form the fluidized bed in which the nozzle is embedded from lifting into the nozzle inlet port should forward flow be arrested and some blackflow occur. To this end, the parameters are such that the backflowing liquid in the cylindrical outlet section 14C has a velocity which is less than the minimum fluidization velocity of the bed particles. Should the backflow velocity exceed the minimum fluidization velocity, suspension and motion of the particles would result, causing the particles to rise into the nozzle inlet port.

And while the nozzle is designed to prevent backflow of the media, because it is obstructionless it cannot be plugged or otherwise impeded by stringy solids carried by the wastewater.

In the modified fluidized bed reactor shown in FIG. 3, use is made of screw-in nozzles 14 of the same type shown in FIG. 1; but in this instance, the incoming wastewater is introduced into a plenum chamber 18 defined by a plenum 19 above which lies the particulate bed 15. The manifold 13' for the distributor in this instance is supplied with incoming wastewater by end pipes 20 and 21 which communicate with the plenum chamber. The operation of this distributor arrangement is otherwise essentially the same as in the reactor shown in FIG. 1.

Second Embodiment:

The fluidized bed reactor shown in FIG. 4 is identical to that shown in FIG. 1, and the incoming wastewater fed into line 11 is supplied into the center input pipe 12 of a horizontal manifold 22. This differs from manifold 13 in FIG. 1, in that the array of outlet ports extends along the upper side, not the lower side of the manifold, so that the liquid is discharged by the ports upwardly into a bank of nozzles 23.

Each nozzle 23, as best seen in FIG. 5, includes a conical flow expansion section 23A and a cylindrical outlet section 23B. Supported coaxially within outlet section 23B by a symmetrical array of vanes 26 is an inlet port 24 having an externally threaded lower end 25 which projects below the outlet section and screws into a threaded manifold hole. It is to be noted that the lower end of each vane is secured to the upper end of inlet port 24 and that the upper vane end is secured to the junction of the flow expansion section 23A and outlet section 23B, thereby forming an angle $\theta$ with the cylindrical wall of outlet section 23B.

Thus the wastewater flowing upwardly through inlet port 24 is projected from flow expansion section 23A, the flow of energy being dissipated thereby. The wastewater fed into flow expansion section 23A then flows downwardly into outlet section 23B and is discharged from this section into the fluidized bed. The relatively sharp angle $\theta$ of the vanes is set so that any stringy solids carried by the wastewater which is caught by the vanes will tend to slide down toward the inlet port and be dislodged. The geometry of this nozzle is such that in the event backflow occurs, particles from the bed will not be lifted and enter the inlet port, for the same reasons set forth in connection with nozzles 13 in FIG. 1.

In the modified form of reactor shown in FIG. 6, which includes a plenum 27 defining a plenum chamber 28 below fluidized bed 15, the nozzles 23 are screwed into ports formed in plenum 27, the operation otherwise being the same as in FIG. 4.

Third Embodiment:

In the distributor arrangement shown in FIGS. 4 and 6, the wastewater is discharged by the nozzles in the vertical direction downwardly into the bed. It is sometimes advantageous to effect a lateral rather than a vertical nozzle discharge.

In the nozzle arrangement shown in FIGS. 8 and 9, a flow inlet port 27 is supported coaxially within the cylindrical outlet section 29B of the nozzle by means of symmetrically arranged vanes 28, as in FIG. 5, the wastewater being projected by the inlet port into the conical expansion section 29A. However, in this instance, the outlet section 29B is spaced from the plenum or manifold 30 to which the nozzle is attached by means of a spacer ring 31 which defines a lateral outlet passage 32, so that instead of a downward discharge into the bed from the outlet section, a lateral discharge in the horizontal direction is produced by outlet passage 32.

With a lateral discharge, there is less turbulence and jetting into the fluidized bed than would occur with a vertical discharge. The advantages gained thereby are similar to those attained with the distributor disclosed in the above-noted Kos patent, coupled with the advantages gained with respect to the free flow of stringy solids and the avoidance of adverse backflow effects. A lateral discharge arrangement may also be included in the nozzles illustrated in the first embodiment.

While there have been shown and described preferred embodiments of a liquid flow distributor in accordance with the invention, it will be appreciated that many changes and modifications may be made therein without, however, departing from the essential spirit thereof. Thus, instead of a pipe, the manifold may be defined by a plate having an array of openings therein to receive the inlet ports of the distributors, which plate may be planar or concave.

We claim:

1. A flow distributor for dispersing wastewater or other incoming liquids carrying stringy solids throughout a particulate media in a fluidized bed such as in a fluidized bed reactor, the distributor permitting forward flow of the liquid without clogging and also functioning to prevent backflow of the media into the distributor should forward flow be arrested, said distributor comprising:
   A a manifold for conducting the incoming liquid into an array of openings;
   B a nozzle communicating with each opening and disposed in said fluidized bed to discharge said incoming fluid therein, said nozzle having an inlet port leading to a conical flow expansion section whose cone angle which lies in a range of about 15 to 60 degrees is such that the production of backward eddy current or significant turbulence will be minimized, said expansion section merging with an open-ended cylindrical outlet section whose dimensions are such that any backflow which takes place when forward flow is arrested will normally be insufficient to lift the particles into the nozzle inlet port.

2. A distributor as set forth in claim 1, wherein said manifold is formed by a horizontal pipe disposed in said particulate media, the openings being on the lower side thereof, each nozzle inlet port being screwed into the opening whereby the nozzle discharges downwardly into the media.

3. A distributor as set forth in claim 2, wherein said media forms the bed of a fluidized bed reactor, and said manifold is supplied with incoming liquid through a center feed pipe coupled thereto.

4. A distributor as set forth in claim 2, wherein said media forms the bed of a fluidized bed reactor disposed above a plenum chamber which is supplied with the incoming liquid, the manifold pipe communicating with the plenum.

5. A distributor as set forth in claim 1, wherein said manifold is defined by a plate having an array of openings therein which forms a plenum chamber below the fluidized bed which is supplied with the incoming liquid.

6. A distributor as set forth in claim 5, wherein the nozzle has its inlet port coaxially disposed in the outlet section and is held therein by a symmetrical array of vanes, each of which bridges the upper end of the inlet port and the junction of the sections, the lower end of the inlet port being screwed into one of said openings whereby the liquid is projected upwardly into the flow expansion section.

7. A distributor as set forth in claim 6, wherein the angle between each vane and the outlet section is such as to prevent stringy solids from remaining thereon.

8. A distributor as set forth in claim 5, wherein said outlet section is provided with means to effect a lateral discharge therefrom.

* * * * *